US012592160B2

(12) United States Patent
Bradford et al.

(10) Patent No.: US 12,592,160 B2
(45) Date of Patent: Mar. 31, 2026

(54) SYSTEM AND METHOD FOR VIRTUAL LEARNING ENVIRONMENT

(71) Applicant: Virtual Immersive Educational Worlds, Inc., Provo,, UT (US)

(72) Inventors: Linda Bradford, Provo, UT (US); David Bradford, Provo, UT (US); Carlos Suarez, Key Colony Beach, FL (US); Durgesh Waghmare Samarth Kunj, Maharashtra (IN)

( * ) Notice: Subject to any disclaimer, the term of this patent is extended or adjusted under 35 U.S.C. 154(b) by 0 days.

(21) Appl. No.: 18/732,429

(22) Filed: Jun. 3, 2024

(65) Prior Publication Data

US 2024/0404420 A1     Dec. 5, 2024

Related U.S. Application Data

(60) Provisional application No. 63/505,489, filed on Jun. 1, 2023.

(51) Int. Cl.
| | |
|---|---|
| *G09B 7/02* | (2006.01) |
| *G06T 13/40* | (2011.01) |
| *G09B 19/00* | (2006.01) |
| *A63B 71/06* | (2006.01) |
| *G06N 3/006* | (2023.01) |
| *G06N 20/00* | (2019.01) |
| *G06Q 50/20* | (2012.01) |
| *G09B 7/00* | (2006.01) |

(52) U.S. Cl.
CPC ................ *G09B 7/02* (2013.01); *G06T 13/40* (2013.01); *G09B 19/0038* (2013.01); *A63B 2071/0636* (2013.01); *G06N 3/006* (2013.01); *G06N 20/00* (2019.01); *G06Q 50/20* (2013.01); *G09B 7/00* (2013.01)

(58) Field of Classification Search
CPC .......... G06N 20/00; G06N 3/006; G09B 7/02; G09B 7/00; G09B 19/0038; G06T 13/40; G06Q 50/20; A63B 2071/0636
See application file for complete search history.

(56) References Cited

U.S. PATENT DOCUMENTS

| | | | | |
|---|---|---|---|---|
| 9,381,426 B1* | 7/2016 | Hughes | .................. | H04L 67/06 |
| 2022/0277506 A1* | 9/2022 | Lagrone | .................. | G06T 13/40 |
| 2022/0385700 A1* | 12/2022 | Kasaba | .................. | H04L 51/02 |
| 2023/0092494 A1* | 3/2023 | Shirai | .................... | A63F 13/30 |
| | | | | 345/419 |
| 2023/0154187 A1* | 5/2023 | Bruso | .................... | G06V 20/41 |
| | | | | 382/100 |
| 2023/0211226 A1* | 7/2023 | Morin | .................... | G06F 3/012 |
| | | | | 345/633 |
| 2024/0135617 A1* | 4/2024 | Lagrone | .................. | G16H 40/67 |

* cited by examiner

*Primary Examiner* — Jack Yip

(57) ABSTRACT

A computer-implemented method includes generating a virtual learning environment comprising a three-dimensional interactive virtual environment. The virtual learning environment includes at least one student avatar related to a user and a second avatar that functions as an automated tutor. The automated tutor is powered by an AI processor and machine learning to generate interactive real-time responses in response to queries input by the user.

11 Claims, 4 Drawing Sheets

400

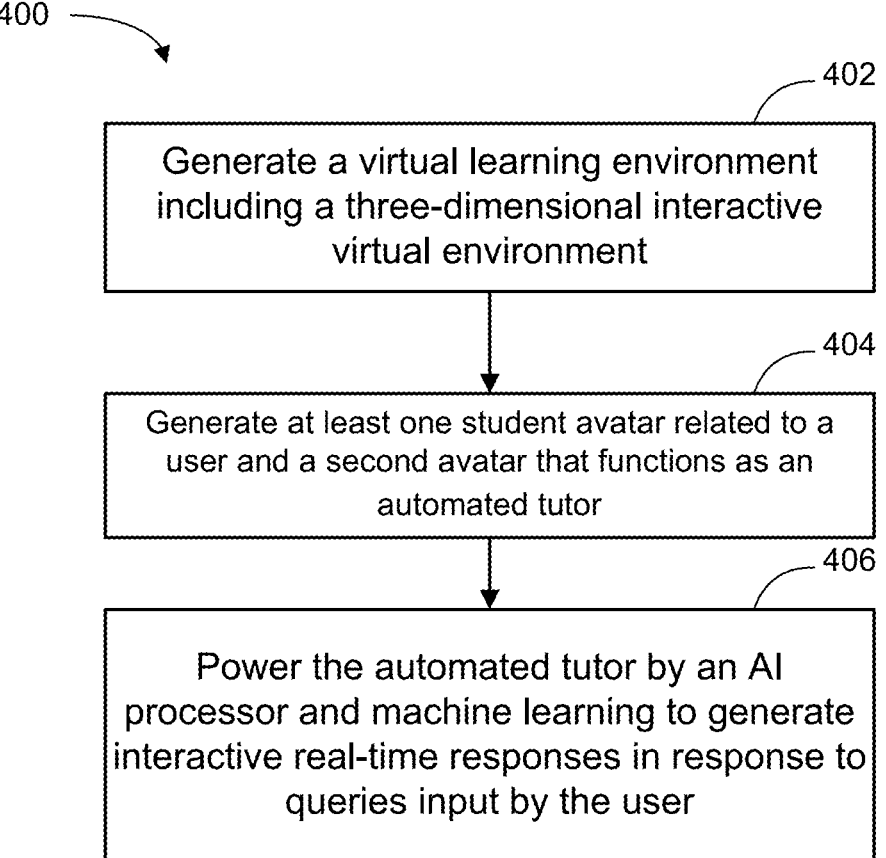

402

Generate a virtual learning environment including a three-dimensional interactive virtual environment

404

Generate at least one student avatar related to a user and a second avatar that functions as an automated tutor

406

Power the automated tutor by an AI processor and machine learning to generate interactive real-time responses in response to queries input by the user

FIG. 4

SYSTEM AND METHOD FOR VIRTUAL LEARNING ENVIRONMENT

CROSS-REFERENCE TO RELATED APPLICATIONS

This application claims the benefit of U.S. Provisional Application No. 63/505,489, filed on Jun. 1, 2023, which is incorporated by reference herein in its entirety.

FIELD

This disclosure relates generally to a system and method for immersing a user in a virtual classroom. More particularly, embodiments of the invention relate to a method or system that is interactive and artificial intelligence (AI) driven. Embodiments of the invention relate to a method or system that an immersive three-dimensional (3D) classroom system. Embodiments of the invention relate to a method or system that integrates virtual environments modeled after real life locations with automated tutors.

BACKGROUND

Recent years have seen significant improvements in the utilization of AI to conduct work usually reserved for humans. Teaching has traditionally been based on a teacher and student relationship where a teacher's attention can only be divided between limited number of students before a major drop-off in learning occurs. An AI driven immersive classroom however can be divided between an almost limitless number of students that can have a similar relationship to an automated tutor that is configured to mimic a particular teacher. Such learning environments allow for the rapid expansion of teaching to more and more students on an almost limitless scale of subjects.

Conventional systems have shortcomings in their ability to quickly answer queries posed by students which makes students disengage. Embodiments herein overcome this, and other shortcomings.

The subject matter of the present application has been developed in response to the present state of the art, and in particular, in response to the problems and disadvantages associated with conventional systems that have not yet been fully solved by currently available techniques. Accordingly, the subject matter of the present application has been developed to provide embodiments of a system and method for a virtual classroom.

Embodiments of the invention utilize artificial intelligence (AI) to assess students' knowledge, mannerisms, and learning styles. A database is utilized to store information and data relating to both individual users (students) and real-life tutors (throughout teachers is used interchangeably with tutors). Embodiments of the invention utilize artificial intelligence (AI) to assess and mimic the mannerisms and teachings styles of teachers.

Embodiments of the invention provide a visually immersive and interactive 3D virtual environment. In many implementations, students can attend classes and interact with the virtual surroundings, similar to a traditional classroom. In many implementations, students can attend classes in historically significant locations to better give students an immersive experience that has meaning or connection to a particular subject.

Embodiments of the invention incorporates automated tutors or teachers powered by artificial intelligence algorithms. Such automated tutors can be based on a particular teacher or on a historical figure. The automated tutor or teach can understand and respond to student queries, providing real-time answers in a natural and interactive manner. Such interaction can occur via direct voice communication between the user (student) and the automated tutor teacher.

Embodiments of the invention allow for the immersive learning on electronic devices that can keep students engaged, while stimulating the same reward centers of the brain that are stimulated through electronic gaming. Embodiments described herein provide many benefits that are discussed more thoroughly below.

SUMMARY

Disclosed herein is a computer-implemented method. The computer-implemented method includes generating a virtual learning environment comprising a three-dimensional interactive virtual environment. The virtual learning environment includes at least one student avatar related to a user and a second avatar that functions as an automated tutor. The automated tutor is powered by an AI processor and machine learning to generate interactive real-time responses in response to queries input by the user. The preceding subject matter of this paragraph characterizes example 1 of the present disclosure.

The computer-implemented method further includes storing training materials for the automated tutor in a teacher database, wherein the training materials are used to train the automated tutor to mimic a real-life teacher. The preceding subject matter of this paragraph characterizes example 2 of the present disclosure, wherein example 2 also includes the subject matter according to example 1, above.

The computer-implemented method further includes training the automated tutor to clone a voice of the real-life teacher. The preceding subject matter of this paragraph characterizes example 3 of the present disclosure, wherein example 3 also includes the subject matter according to any one of examples 1-2, above.

The computer-implemented method further includes generating a series of questions to the user and determining an expected education level of the user based off answers to the questions. The preceding subject matter of this paragraph characterizes example 4 of the present disclosure, wherein example 4 also includes the subject matter according to any one of examples 1-3, above.

The computer-implemented method further includes generating responses to the queries based on the expected education level of the user. The preceding subject matter of this paragraph characterizes example 5 of the present disclosure, wherein example 5 also includes the subject matter according to any one of examples 1-4, above.

The computer-implemented method further includes utilizing an AI algorithm to analyze actions and performance of the at least one student avatar to generate tailored learning exercises. The preceding subject matter of this paragraph characterizes example 6 of the present disclosure, wherein example 6 also includes the subject matter according to any one of examples 1-5, above.

The computer-implemented method further includes translating the real-time response into a second language. The preceding subject matter of this paragraph characterizes example 7 of the present disclosure, wherein example 7 also includes the subject matter according to any one of examples 1-6, above.

Disclosed herein is a computer system. The computer system includes one or more processors and memory including instructions which, when accessed by the one or more processors, cause the one or more processors to generate a virtual learning environment comprising a three-dimensional interactive virtual environment. The virtual learning environment includes at least one student avatar related to a user and a second avatar that functions as an automated tutor. The automated tutor is powered by an AI processor and machine learning to generate interactive real-time responses in response to queries input by the user. The preceding subject matter of this paragraph characterizes example 8 of the present disclosure.

The memory includes further instructions which cause the one or more processors to store training materials for the automated tutor in a teacher database, wherein the training materials are used to train the automated tutor to mimic a real-life teacher. The preceding subject matter of this paragraph characterizes example 9 of the present disclosure, wherein example 9 also includes the subject matter according to any one of examples 1-8, above.

The memory includes further instructions which cause the one or more processors to train the automated tutor to clone a voice of the real-life teacher. The preceding subject matter of this paragraph characterizes example 10 of the present disclosure, wherein example 10 also includes the subject matter according to any one of examples 8-9, above.

The memory includes further instructions which cause the one or more processors to generate a series of questions to the user and determining an expected education level of the user based of answers to the questions. The preceding subject matter of this paragraph characterizes example 11 of the present disclosure, wherein example 11 also includes the subject matter according to any one of examples 8-10, above.

The memory includes further instructions which cause the one or more processors to generate responses to the queries based on the expected education level of the user. The preceding subject matter of this paragraph characterizes example 12 of the present disclosure, wherein example 12 also includes the subject matter according to any one of examples 8-11, above.

The memory includes further instructions utilize an AI algorithm to analyze actions and performance of the at least one student avatar to generate tailored learning exercises. The preceding subject matter of this paragraph characterizes example 13 of the present disclosure, wherein example 13 also includes the subject matter according to any one of examples 8-12, above.

The memory includes further instructions which cause the one or more processors to translating the real-time response into a second language. The preceding subject matter of this paragraph characterizes example 14 of the present disclosure, wherein example 14 also includes the subject matter according to any one of examples 8-13, above.

Disclosed herein is a computer system. The computer system includes a core engine comprising one or more processors and configured to generate a virtual learning environment comprising a three-dimensional interactive virtual environment. The computer system includes an avatar engine comprising one or more processors and configured to generate at least one student avatar related to a user. The computer system includes an automated teacher engine comprising one or more processors and configured to generate a second avatar that functions as an automated tutor, wherein the automated tutor is powered by an AI processor and machine learning to generate interactive real-time responses in response to queries input by the user. The preceding subject matter of this paragraph characterizes example 15 of the present disclosure.

The automated teacher engine is further configured to store training materials for the automated tutor in a teacher database, wherein the training materials are used to train the automated tutor to mimic a real-life teacher. The preceding subject matter of this paragraph characterizes example 16 of the present disclosure, wherein example 16 also includes the subject matter according to example 15, above.

The automated teacher engine is further configured to train the automated tutor to clone a voice of the real-life teacher. The preceding subject matter of this paragraph characterizes example 17 of the present disclosure, wherein example 17 also includes the subject matter according to any one of examples 15-16, above.

The computer system includes an artificial intelligence engine comprising one or more processors and configured to generate a series of questions to the user and determining an expected education level of the user based of answers to the questions. The preceding subject matter of this paragraph characterizes example 18 of the present disclosure, wherein example 18 also includes the subject matter according to any one of examples 15-17, above.

The artificial intelligence engine is configured to generate responses to the queries based on the expected education level of the user. The preceding subject matter of this paragraph characterizes example 19 of the present disclosure, wherein example 19 also includes the subject matter according to any one of examples 15-18, above.

The artificial intelligence engine is configured to utilize an AI algorithm to analyze actions and performance of the at least one student avatar to generate tailored learning exercises. The preceding subject matter of this paragraph characterizes example 20 of the present disclosure, wherein example 20 also includes the subject matter according to any one of examples 15-19, above.

Other aspects and advantages of embodiments of the present invention will become apparent from the following detailed description, taken in conjunction with the accompanying drawings, illustrated by way of example of the principles of the invention.

BRIEF DESCRIPTION OF DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered limiting of its scope, the subject matter will be described and explained with additional specificity and detail through the use of the drawings.

FIG. 4 depicts a schematic flow diagram of a virtual learning method, according to one or more embodiments of the invention.

Figure 1:
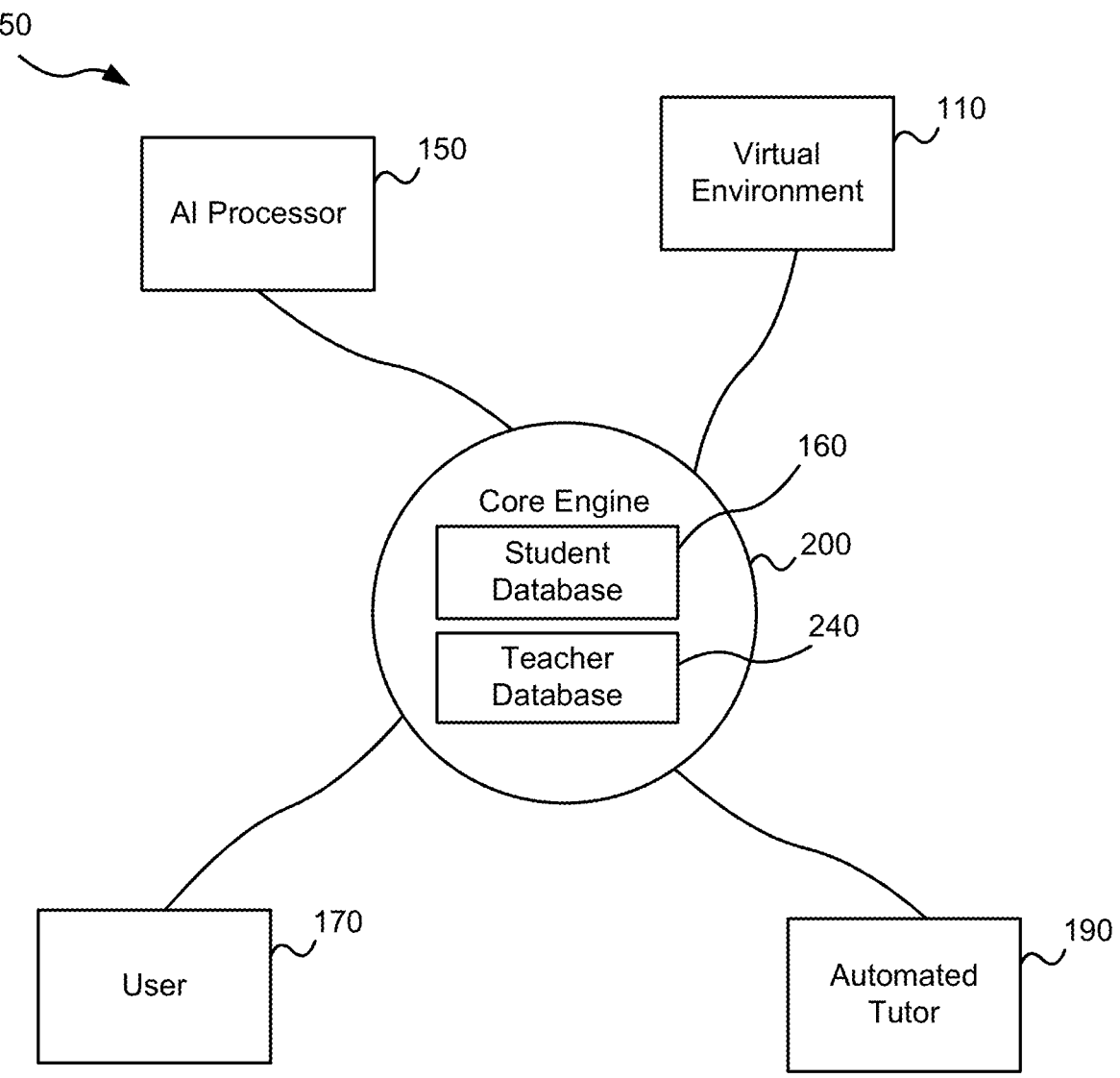
FIG. 1 depicts a schematic diagram of a virtual learning system according to one or more embodiments of the present disclosure.

Throughout the description, similar reference numbers may be used to identify similar elements. Throughout this application, similar designations or vocabulary may be used to identify similar elements, although the breadth of this disclosure should be understood to incorporate any alternatives and variations referenced within the specification (including the claims) and the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments described herein include a system and method for immersing a user in a virtual classroom. More particularly, embodiments of the invention relate to a method or system that is interactive and artificial intelligence (AI) driven. Embodiments of the invention relate to a method or system that an immersive three-dimensional (3D) classroom system. Embodiments of the invention relate to a method or system that integrates virtual environments modeled after real life locations with automated tutors.

Within this virtual classroom, students can attend classes that are no longer confined to the physical limitations of a conventional room. Instead, they are transported into meticulously crafted virtual environments that can range from historical landmarks to outer space, providing a rich and engaging backdrop for their studies.

This virtual setting allows students to interact with their surroundings in ways that were previously unimaginable. For example, in a biology class, students can explore the intricate structures of a cell by virtually navigating through its components, while in a history class, they can walk through ancient cities and witness historical events as if they were there. This level of immersion not only makes learning more enjoyable but also enhances retention and understanding by providing experiential learning opportunities.

Central to the virtual learning system are automated tutors. These tutors are powered by advanced artificial intelligence algorithms capable of understanding and responding to student queries in real time. Unlike traditional automated systems that rely on pre-programmed responses, these AI-driven tutors utilize natural language processing and machine learning to engage in meaningful and contextually relevant conversations with students. This capability allows them to provide real-time answers to a wide array of questions, adapting their responses to the unique needs and learning paces of individual students.

The interaction between students and these automated tutors is designed to mimic the natural flow of conversation, making the learning experience more intuitive and less mechanical. Students can ask questions and receive immediate, clear, and accurate responses, just as they would with a human teacher. This direct voice communication fosters a more personal and engaging learning experience, encouraging students to actively participate and seek clarification without hesitation.

Furthermore, these AI tutors are not limited to reactive responses. They can proactively guide students through complex concepts, offer personalized learning paths, and even assess student performance to provide targeted feedback. By analyzing a student's progress and identifying areas of difficulty, the AI tutors can adjust their teaching strategies, ensuring that each student receives a customized learning experience tailored to their individual needs.

The system extends to virtually any subject. Whether it's mathematics, science, literature, or art, the system can adapt its virtual environments and automated tutoring to suit the educational requirements of different disciplines. This adaptability makes it an invaluable tool for educators, providing them with the resources to create engaging, interactive, and effective lessons across a broad spectrum of subjects.

Moreover, the system's integration of advanced technologies ensures that it remains at the forefront of educational innovation. By continuously updating its AI algorithms and virtual environments, the interactive 3D Classroom system evolves alongside the ever-changing landscape of education, maintaining its relevance and effectiveness in fostering a new generation of learners.

Embodiments of the system revolutionize the way one can approach education by combining the immersive capabilities of virtual reality with the intelligent interactivity of artificial intelligence. It offers an engaging and personalized learning experience that not only makes education more accessible but also more effective. With its automated tutors and versatile virtual environments, this system stands as a testament to the transformative potential of technology in education, paving the way for a future where learning is truly limitless.

While many embodiments are described herein, at least some of the described embodiments describe a computer-implemented method.

FIG. 1 depicts a schematic overall diagram of a system 50 according to one or more embodiments of the present disclosure. Although the system 50 is shown and described with certain components and functionality, other embodiments of the system 50 may include fewer or more components to implement less or more functionality.

Referring to FIG. 1, a generalized understanding of embodiments of the invention is possible with respect to the overall system 50 described with FIG. 1. The system 50 includes a core engine 200. The core engine 200 directly or via an API layer (application programming interface) communicates with various other components that may be internal or external with the core engine 200. The core engine 200 is an engine that is configured to aggregate and analyze information and data and interface between a user 170 and a virtual environment 110 with an automated tutor 190. The core engine 200 may be partially computer software based to carry out the functions that are set forth herein.

A component that the core engine 200 communicates with includes, in some embodiments, a student database 160. The student database 160 may be located in a separate system that communicates with the core engine 200 or as part of the core engine 200. The student database 160 may be configured to store data and information about the user 170 so that the system 50 can teach at an appropriate level. A college level student will likely need a different environment than an elementary level student. In some embodiments, the system 50 goes beyond merely responding to user 170 inquiries; it actively engages users by asking questions and evaluating their responses. This can be done in an evaluation session or throughout the teaching process. This dynamic interaction transforms passive learning into an active, participatory process, which is crucial for deeper understanding and retention of knowledge.

The system's AI-driven tutors 190 are programmed to ask questions that are both relevant to the material being taught and appropriate to the user's current level of understanding. These questions can vary in complexity, from simple factual inquiries to more complex, open-ended problems that require critical thinking and analysis. Once a user 170 provides a response, the system 50 can store the response in the student database 160. The system 50 is configured to evaluate the response (and past responses) using advanced natural language processing (NLP) techniques and machine learning algorithms. These technologies allow the AI to understand the nuances of the student's answer. The answer may be evaluated across many levels, including, but not limited to, the accuracy, depth, and context of the response. The evaluation process may check for correctness or error. The system 50 may also assess the reasoning behind the student's answer. For example, if a student gives a partially correct response, the AI can identify which aspects were misunderstood and which were comprehended correctly. Based on this evaluation, the automated tutor 190 can provide immediate feedback, highlighting areas where the student excelled and offering explanations or additional resources for concepts that need further clarification. The system 50 is configured to have a feedback loop that may aid in reinforcing learning and ensuring that misconceptions are addressed promptly.

The system 50 tailors its teaching strategies to the individual needs of each student. By continuously analyzing the student's responses and tracking their progress over time, the automated tutor 190 builds a comprehensive profile of the student's strengths and weaknesses. This profile allows the AI to adapt the difficulty and focus of subsequent questions and instructional material. For instance, if a student consistently struggles with a particular concept, the automated tutor 190 might provide additional practice problems, explanatory videos, or interactive simulations to help the student grasp the concept more effectively.

The automated tutor 190 can adjust the speed at which new material is introduced based on the student's proficiency and comfort level. For users 170 who quickly master new concepts, the AI can accelerate the curriculum to keep them challenged and engaged. Conversely, for users 170 who need more time to understand the material, the AI can slow down the pace and offer more detailed explanations and practice opportunities.

The system 50 not only revolutionizes the way users 170 learn by immersing them in engaging virtual environments 110 but also elevates the educational experience through intelligent, personalized interactions.

The core engine 200 is further configured to train and develop the automated tutor 190. The core engine 200 can communicate with a teacher database 240. The system 50 can integrate videos, writings, and course materials from a particular teacher to develop an automated tutor 190 that closely mimics or even clones the voice and teaching style of that teacher. Such materials can be stored in the teacher database 240. This capability not only enhances the personalization of the learning experience but also ensures continuity and consistency in instructional quality.

The system 50 may collect a comprehensive set of teaching materials from the teacher, such as recorded video lectures, audio clips, written notes, assignments, lesson plans, and other instructional content reflecting the teacher's unique style. Utilizing audio recordings, the system 50 can capture the teacher's voice, tone, inflection, and mannerisms. Utilizing video recordings, the system 50 can analyze body language and facial expressions, which can be incorporated into a virtual avatar for the automated tutor 190. The collected writings and course materials are analyzed to understand the teacher's language patterns, vocabulary, and preferred methods of explanation, helping the system to replicate the teacher's way of conveying information, including their use of metaphors, examples, and anecdotes.

Using the gathered audio samples, the system 50 trains a deep learning model to replicate the teacher's voice. This involves sophisticated algorithms that can synthesize speech to sound like the teacher, capturing not just the words but the nuances of how they speak. The AI integrates this synthesized voice with the teacher's teaching style derived from their writings and course materials, creating a virtual tutor that functions as an automated tutor 190 that can deliver lectures, provide explanations, and interact with users 170 in a manner closely mimicking the teacher. The automated tutor 190 is also trained to understand and respond to student queries in real-time, maintaining the teacher's style.

The automated tutor 190 is then embedded into the immersive 3D classroom environment, where users 170 can interact with it as they would with the real teacher, asking questions and receiving answers in the teacher's voice and style. This feature is particularly beneficial in ensuring consistency when the teacher is unavailable, providing continuity in the students' learning experience. While the automated tutor 190 mimics the teacher, it also utilizes AI capabilities to personalize learning, adapting the material and teaching style to suit each student's learning pace and preferences, thus providing a customized educational experience.

Additionally, the system 50 can integrate supplementary multimedia resources such as videos, interactive simulations, and reading materials, enhancing the automated tutor's lessons in a way that aligns with the teacher's pedagogical approach. The system 50 continually learns and improves from interactions with users 170, providing detailed feedback to the real teacher about student performance and areas where users 170 are struggling, allowing for further refinement of teaching strategies. This technology makes quality education accessible to a broader audience, enabling users 170 who may not have the opportunity to learn from a particular teacher due to geographical or other constraints to benefit from their expertise through the automated tutor 190.

In addition to regular teachers, the system 50 may be configured to develop and train an automated tutor 190 based on other figures. The system 50 extends its capabilities beyond mimicking current educators to recreating famous historical figures, such as Abraham Lincoln, offering users 170 an engaging and immersive way to learn about history. By leveraging advanced technologies like natural language processing (NLP), machine learning, and deep learning, the system 50 can bring these iconic personalities to life within the virtual classroom environment.

The system 50 can be trained similarly to how it is done with a current teacher using an historical figure's speeches, letters, and other writings or recordings. Such famous figures may add to the learning experience so that a student can learn astronomy from Copernicus, physics from Newton, or politics from Abraham Lincoln.

The core engine 200, in some embodiments, is configured to retrieve data from the student database 160 and the teacher database 240. The core engine 200 may be configured to retrieve whatever data is necessary for the other components to function as described herein.

In some embodiments, the core engine 200 is configured to communicate with an Artificial Intelligence (AI) platform or AI processor 150. In some embodiments, the information communicated with the AI processor 150 includes all the data retrieved from the student database 160. In some embodiments, the information communicated with the AI processor 150 includes only some of the data retrieved from the student database 160 or the teacher database 240. In some embodiments, the system 50 is configured to feed student queries into the Artificial Intelligence (AI) platform or AI processor 150. The Artificial Intelligence (AI) platform or AI processor 150 may be configured with streaming capabilities that allow for an audio stream to be relayed back and played in real time. Such speed of response allows for keeping users 170 engaged and present with the material.

In many embodiments the system includes a virtual world engine that can be used to build the virtual world (a traditional classroom or historical locations are generated). The virtual world engine can evaluate pictures to generate a virtual world based off pictures of real-world locations.

The system's advanced technology allows users to move freely within these virtual environments. Users 170 can walk, run, or teleport to different locations within a virtual world, providing a sense of presence and immersion that enhances learning. Teleportation features enable quick transitions between different environments, making it easy to switch contexts as needed. Users 170 can independently explore different areas within a virtual world, fostering curiosity and self-directed learning. For example, in a virtual museum, they can choose which exhibits to visit and delve deeper into topics that interest them most.

In addition to selecting environments, users 170 can choose the type and nature of their tutor 190, further personalizing their learning experience. The system offers a variety of tutor options. For younger users or those who benefit from a more playful approach, cartoon character tutors can make learning fun and approachable. These tutors can simplify complex concepts and provide encouragement in an engaging, friendly manner. Users 170 studying specific historical periods or figures can learn from a tutor modeled after someone like Abraham Lincoln, Leonardo da Vinci, or Marie Curie. These tutors not only teach academic content but also provide insights into the lives and contributions of these figures, enriching the educational experience.

To maintain the educational integrity and appropriateness of the virtual classroom, the system uses advanced natural language processing (NLP) algorithms to detect and manage inappropriate questions. The system is trained to recognize questions and statements that contain inappropriate or sensitive content. This includes language that is offensive, discriminatory, or otherwise unsuitable for an educational setting. When a student inputs a question or comment, the system's algorithms will analyze the text. If the content is deemed inappropriate, the system will not respond directly to the question. The system can provide a predefined, respectful message indicating that the question or comment is not suitable, or the system can redirect the student to a more appropriate question or comment that can be answered by the system.

The system maintains a comprehensive list of profane and inappropriate words and phrases. Whenever a student inputs text, the filter scans for these keywords.

The system uses advanced machine learning techniques to ensure that it continually adapts and improves its educational offerings. This continuous adaptation is crucial for providing a personalized and effective learning experience that evolves with the needs of each student. As users 170 interact with the system, data is continuously collected on various aspects of their learning journey. This includes their responses to questions, the time they spend on different tasks, their engagement levels, and their performance on assessments. Machine learning algorithms analyze this data to identify patterns and trends. For example, the system can detect if a student consistently struggles with a particular type of problem or if they excel in specific subject areas. Based on these patterns, the system generates feedback that is used to adjust the learning experience. This feedback loop ensures that the system is always improving. For instance, if a student is having difficulty with a concept, the system might introduce additional practice problems, provide alternative explanations, or suggest supplemental resources. The continuous influx of data allows the system to refine its algorithms. Over time, these refinements lead to more accurate and personalized recommendations. The system becomes better at predicting which teaching methods and materials will be most effective for each student, enhancing the overall learning experience.

Although described generally as an AI processor, the AI processor may be a general neural network with back propagation via reinforced learning with human feedback.

The foregoing discussion is a general discussion of many of the processes present in some embodiments of the invention and the discussion is for illustrative purposes. Other embodiments may include variations of these processes.

Figure 2:
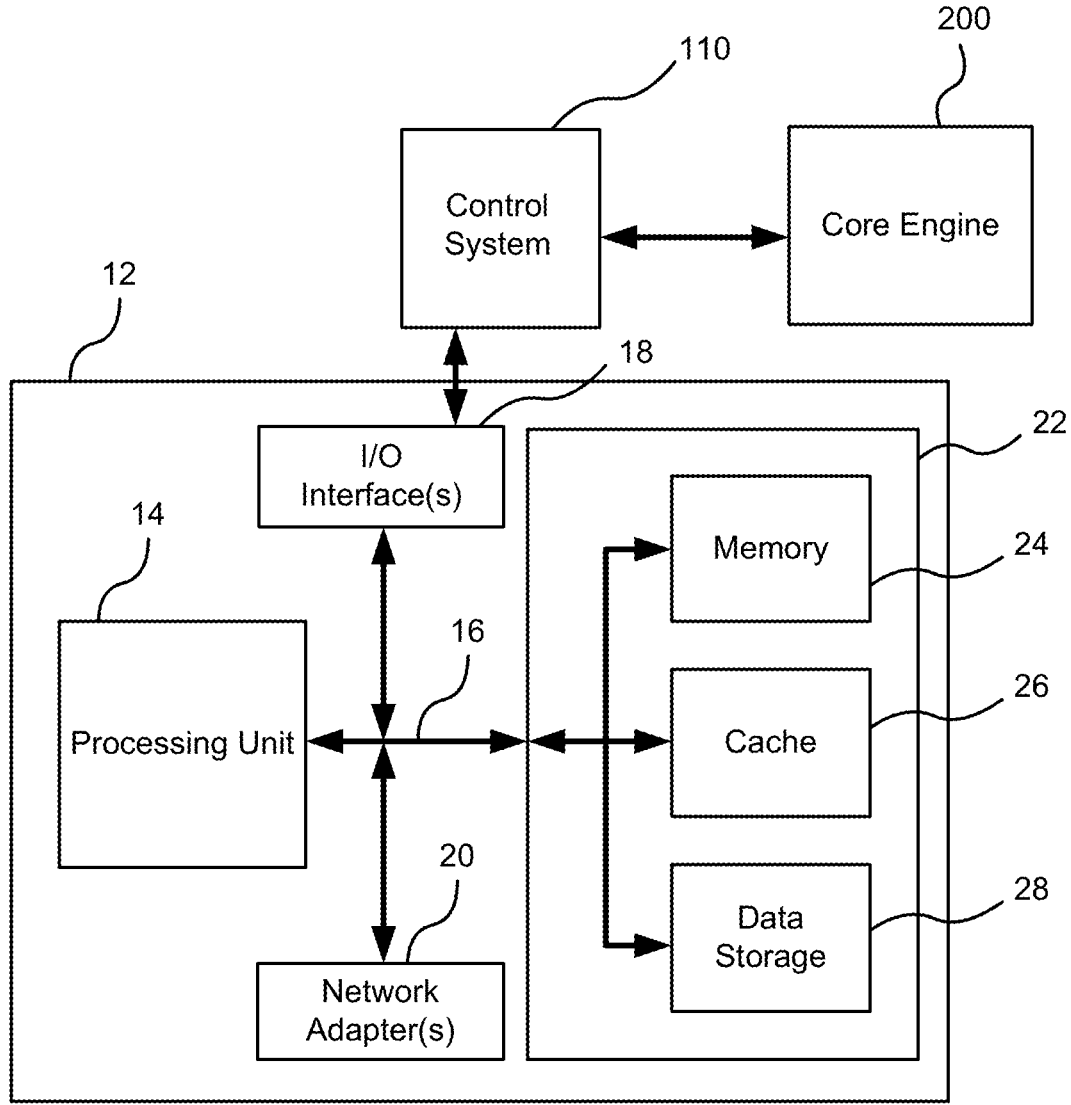
FIG. 2 depicts a schematic diagram of a computing system according to one or more embodiments of the present disclosure.

Referring now to FIG. 2, a schematic diagram of a computing system 100 is shown. Although the computing system 100 is shown and described with certain components and functionality, other embodiments of the computing system 100 may include fewer or more components to implement less or more functionality.

In some embodiments, aspects of the computing system 100 are implemented via a networked system or a computer system 12 or its component parts. The illustrated computer system 12 may include, but is not limited to, one or more processing arrangements, for example including processors or processing units 14, a communication bus 16, one or more input/output (I/O) adapters 18, one or more network adapters 20, and a system memory 22.

In one embodiment, the system memory 22 includes computer system readable media in the form of volatile memory, such as random-access memory (RAM) 24 and/or cache memory 26. The system memory 22 may further include other removable/non-removable, volatile/non-volatile computer system storage media 28. In such instances, each can be connected to the bus 16 by one or more data media interfaces. The memory 22 may include at least one program product having a set (e.g., at least one) of program modules that are configured to carry out the functions of proposed embodiments. For instance, the memory 22 may include a computer program product having programs executable by the processing unit 14 to perform processes described herein. Programs and/or utilities having a set (at least one) of program modules may be stored in the memory 22. Program modules generally carry out the functions and/or methodologies described herein.

The computer system 12 may also communicate with one or more external devices such as a keyboard, a display, sensors 122, cameras, apps, or other external devices, including but not limited to a control system 110. Also, the computer system 12 can communicate with one or more networks such as a local area network (LAN), a general wide area network (WAN), and/or a public network (e.g., the Internet) via network adapter 20.

In the context of the present application, where embodiments of the present invention constitute a method, it should be understood that such a method is a process for execution by a computer, i.e. is a computer-implementable method. The steps of the method therefore reflect various parts of a computer program, e.g., parts of one or more algorithms. Embodiments of the present invention may be a system, a method, and/or a computer program product. The computer program product may include a computer readable storage medium (or media) having computer readable program instructions thereon for causing a processor to carry out aspects of the present invention.

Referring to FIG. 2 again, the control system 110 interacts with and receives communication with the core engine 200. The control system 110 is further configured to control the system 100 and its function as the core engine communicates with the various components outlined in conjunction with FIG. 1. In some embodiments, more than one control system 110 may control the various components of the system 102 or the general system 100.

The system 102 or general system 100 may be utilized to implement a computer-implemented method. In some embodiments, the computer-implemented method includes generating a virtual learning environment comprising a three-dimensional interactive virtual environment. The virtual learning environment includes at least one student avatar related to a user and a second avatar that functions as an automated tutor. The automated tutor is powered by an AI processor and machine learning to generate interactive real-time responses in response to queries input by the user.

In some embodiments, the computer-implemented method further includes storing training materials for the automated tutor in a teacher database, wherein the training materials are used to train the automated tutor to mimic a real-life teacher. In some embodiments, the computer-implemented method further includes training the automated tutor to clone the voice of the real-life teacher.

In some embodiments, the computer-implemented method further includes generating a series of questions to the user and determining an expected education level of the user based off answers to the questions. In some embodiments, the computer-implemented method further includes generating responses to the queries based on the expected education level of the user.

In some embodiments, the computer-implemented method further includes utilizing an AI algorithm to analyze actions and performance of the at least one student avatar to generate tailored learning exercises. In some embodiments, the computer-implemented method further includes translating the real-time response into a second language.

Figure 3:
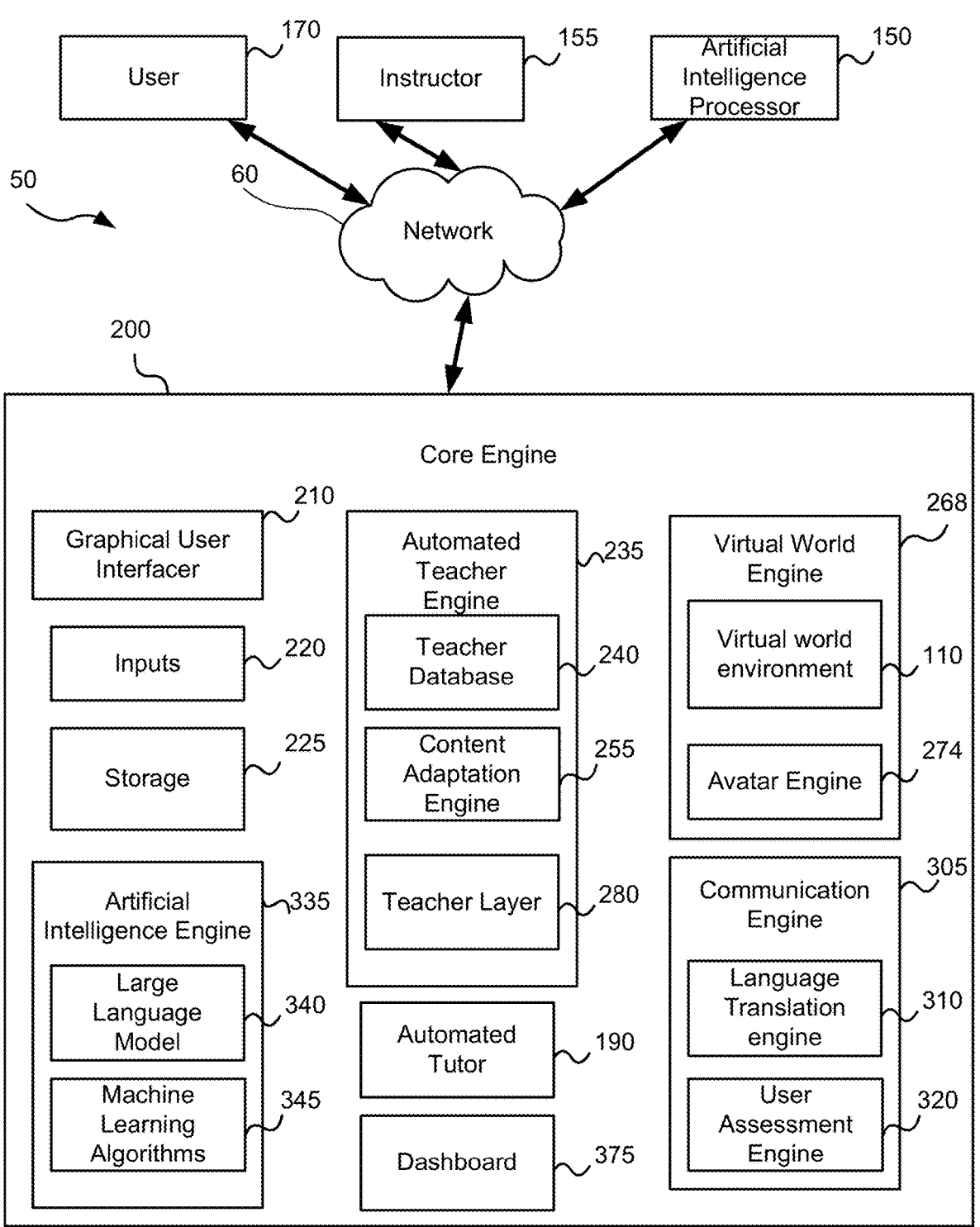
FIG. 3 depicts an overall schematic diagram of a virtual learning system, according to one or more embodiments of the invention.

Referring now to FIG. 3, a schematic diagram of a virtual learning system 50 is shown, according to one or more embodiments of the invention, with a more detailed description of the core engine 200. As is shown, the system 50 includes a network 60 that allows for the core engine 200 to communicate with a user 170, an AI processor 150, and an instructor 155 (if needed).

In the illustrated embodiment, the core engine 200 includes various components that may implement many of the processes discussed previously in FIGS. 1 and 2 and the other description found throughout this application. The core engine 200 may include a graphical user interface (GUI) 210. The GUI 210 may include functionality to allow a user 170 to provide inputs 220 to the core engine 200. Such inputs may be stored within the core engine in storage 225 or may be stored in an external database or storage or may be stored as is discussed with computer system 12 of FIG. 2.

The core engine 200 may also comprise sub-engines that are capable of implementing some of the processes and steps that are discussed herein. In the illustrated embodiments, the core engine 200 includes an automated teacher engine 235, a virtual world engine 268, an artificial intelligence engine 335, and a communication engine 305. Although the core engine 200 is shown and described with certain components and functionality, other embodiments of the core engine 200 may include fewer or more components to implement less or more functionality.

The virtual world engine 268 is a sub-engine that is configured to generate a virtual learning environment comprising a three-dimensional interactive virtual environment (this can be done by the core engine itself). The virtual learning environment 110 includes at least one student avatar related to a user 170 and a second avatar that functions as an automated tutor 190. The avatars can be generated by an avatar engine 274.

The core engine 200 also includes an automated teacher engine 235. As part of the automated teacher engine 235, the core engine 200 may include a teacher database 240 as discussed previously. The automated teacher engine 235 is configured to use the teach database 240 and inputs entered into a teacher layer 280 (input by the instructor 155) to generate the automated tutor 190. The automated teacher engine 235 communicates via the communication engine 305 to the AI processor 150. The automated teacher engine 235 and the artificial intelligence engine 335 are able to generate learning modules within the virtual environment. The automated teacher engine 235 and the artificial intelligence engine 335 are also able to communicate and generate real-time responses to queries made by the user. In this manner, the system 50 generates a virtual learning environment that is response to the user's inputs. The automated tutor 190 is able to interact with the user's avatar and simulate a teaching environment.

In some embodiments, the system includes a Teacher Layer 280 that allows instructors to contribute more content. This layer significantly broadens the range of available subjects and enhances the system's adaptability and personalization by integrating human expertise directly into the virtual environment. The Teacher Layer 280 is designed to provide educators with the tools and flexibility to create and manage their own virtual classrooms and allows teachers to upload a wide variety of educational materials, including lesson plans, videos, readings, quizzes, assignments, and interactive simulations. It also allows teachers to design and customize virtual environments to align with their lesson plans.

Embodiments of the invention allow for the flexible creation of course content. This can be done in a powerful, quick, and automated manner that use course content creation tools that can expand on stored training materials. The instructor at the teacher layer 280 enables automated creation of interactive lessons. The lessons are created by using generative AI along with preexisting course information that may be contained in the form of a PowerPoint, a video, or word document. The lessons can be interactive and multimodal and can be created by anyone using the generative AI and communication through the AI processor 150. The course content may then be embedded in a series of preexisting, virtual environments, such as an airport, restaurant, hotel, the pyramids of Egypt, or the beaches of Cabo San Lucas. In this way, teachers and trainers can build course content in rich environments that specifically relate to the topic being taught. Such rich environments are built by the virtual world engine 268.

Embodiments of the invention allow for an everyday schoolteacher to create new lessons for a class or a Learning and Development (L&D) professional to create a set of required training for an organization. The interaction between the teacher layer 280, the artificial intelligence engine 335, the AI processor 150, the virtual world engine 268 allows for something at ideation stage to be quickly moved to realization as virtual world environments with lessons are created. This is done by transforming static content into dynamic and multimodal learning experiences with an avatar in a virtual environment engaging with speaking automated tutors. Stated another way, by immersing learners in relevant and engaging settings, teachers and trainers can effectively convey course content to create materials and information enabling memorable learning experiences.

In some embodiments, the system 50 goes beyond merely responding to user 170 inquiries; it actively engages users by asking questions and evaluating their responses. This can be done in an evaluation session or throughout the teaching process and is carried out by the user assessment engine 320. The user assessment engine 320 can tailor the level of communication that is generated to the user 170. The system's automated tutor 190 is programmed to ask questions that are both relevant to the material being taught and appropriate to the user's current level of understanding. These questions can vary in complexity, from simple factual inquiries to more complex, open-ended problems that require critical thinking and analysis. Once a user 170 provides a response, the system 50 can store the response in storage 225 or the student database 160. The user assessment engine 320 is configured to evaluate the response (and past responses) using advanced natural language processing (NLP) techniques and machine learning algorithms. These technologies allow the AI to understand the nuances of the student's answer. The answer may evaluate across many levels, including, but not limited to, the accuracy, depth, and context of the response. The evaluation process may check for correctness or error. The user assessment engine 320 may also assess the reasoning behind the student's answer. For example, if a student gives a partially correct response, the user assessment engine 320 can identify which aspects were misunderstood and which were comprehended correctly. Based on this evaluation, the content adaptation engine 255 can provide immediate feedback, highlighting areas where the student excelled and offering explanations or additional resources for concepts that need further clarification. The core engine 200 is configured to have a feedback loop that aids in reinforcing learning and ensuring that misconceptions are addressed promptly.

The content adaptation engine 255 tailors its teaching strategies to the individual needs of each student. By continuously analyzing (via the machine learning algorithms 345) the student's responses and tracking their progress over time, the system 50 builds a comprehensive profile of the student's strengths and weaknesses. This profile is continually updated and allows the system 50 to adapt to the difficulty and focus of subsequent questions and instructional material. As an example, if a user 170 struggles with a particular concept, the automated tutor 190 might provide a more tailored teaching environment.

The core engine 200 is further configured to train and develop the automated tutor 190. The core engine 200 can communicate with the teacher database 240 (and inputs by the instructor 155 via the teacher layer 280) to develop an efficient automated tutor 190. The system 50 can integrate videos, writings, and course materials from a particular teacher to develop an automated tutor 190 that closely mimics or even clones the voice and teaching style of the instructor 155. Such materials can be stored in the teacher database 240. This capability not only enhances the personalization of the learning experience but also ensures continuity and consistency in instructional quality.

The automated teacher engine 235 may collect a comprehensive set of teaching materials from the instructor 155, such as recorded video lectures, audio clips, written notes, assignments, lesson plans, and other instructional content reflecting the instructor's unique style. Utilizing audio recordings, the automated teacher engine 235 can capture the instructor's voice, tone, inflection, and mannerisms. Utilizing video recordings, the system 50 can analyze body language and facial expressions, which can be incorporated into a virtual avatar for the automated tutor 190. The collected writings and course materials are analyzed to understand the teacher's language patterns, vocabulary, and preferred methods of explanation, helping the system to replicate the teacher's way of conveying information, including their use of metaphors, examples, and anecdotes.

Using the gathered audio samples, the system 50 trains a deep learning model to replicate the teacher's voice. This can be done via a large language model 340. This involves sophisticated algorithms that can synthesize speech to sound like the teacher, capturing not just the words but the nuances of how they speak. The AI integrates this synthesized voice with the teacher's teaching style derived from their writings and course materials, creating a virtual tutor that functions as an automated tutor 190 that can deliver lectures, provide explanations, and interact with users 170 in a manner closely mimicking the teacher. The automated tutor 190 is also trained to understand and respond to student queries in real-time, maintaining the teacher's style.

The automated tutor 190 avatar is embedded into the immersive virtual environment, where users' avatars can interact with it as they would with the real teacher, asking questions and receiving answers in the teacher's voice and style. This feature is particularly beneficial in ensuring consistency when the teacher is unavailable, providing continuity in the students' learning experience. While the automated tutor 190 mimics the teacher, it also utilizes AI capabilities to personalize learning, adapting the material and teaching style to suit each student's learning pace and preferences, thus providing a customized educational experience.

Additionally, the system 50 can integrate supplementary multimedia resources such as videos, interactive simulations, and reading materials, enhancing the automated tutor's lessons in a way that aligns with the teacher's pedagogical approach. The system 50 continually learns and improves from interactions with users 170, providing detailed feedback to the real teacher about student performance and areas where users 170 are struggling, allowing for further refinement of teaching strategies. This technology makes quality education accessible to a broader audience, enabling users 170 who may not have the opportunity to learn from a particular teacher due to geographical or other constraints to benefit from their expertise through the automated tutor 190.

The virtual world environment 110 may mimic a classroom, including with chalkboards/whiteboards or media players. In some embodiments, the user will not watch an educational video on their computer screen but will see the video generated on a board within the virtual environment so as to help the user be more fully immersed in the virtual environment as if the user were in a regular classroom.

The core engine 200, in some embodiments, is configured to retrieve data from the student database 160 and the teacher database 240. The core engine 200 may be configured to retrieve whatever data is necessary for the other components to function as described herein.

In some embodiments, the core engine 200 is configured to communicate with an Artificial Intelligence (AI) platform or AI processor 150. In some embodiments, the information communicated with the AI processor 150 includes all the data retrieved from the student database 160. In some embodiments, the information communicated with the AI processor 150 includes only some of the data retrieved from the student database 160 or the teacher database 240. In some embodiments, the system 50 is configured to feed student queries into the Artificial Intelligence (AI) platform or AI processor 150. The Artificial Intelligence (AI) platform or AI processor 150 may be configured with streaming capabilities that allow for an audio stream to be relayed back and played in real time. Such speed of response allows for keeping users 170 engaged and present with the material.

The system's advanced technology allows users to move freely within these virtual environments. Users 170 can walk, run, or teleport to different locations within a virtual world, providing a sense of presence and immersion that enhances learning. Teleportation features enable quick transitions between different environments, making it easy to switch contexts as needed. Users 170 can independently explore different areas within a virtual world, fostering curiosity and self-directed learning. For example, in a virtual museum, they can choose which exhibits to visit and delve deeper into topics that interest them most.

In addition to selecting environments, users 170 can choose the type and nature of their tutor 190, further personalizing their learning experience. The system offers a variety of tutor options. For younger users 170 or those who benefit from a more playful approach, cartoon character tutors can make learning fun and approachable. These tutors can simplify complex concepts and provide encouragement in an engaging, friendly manner. Users 170 studying specific historical periods or figures can learn from a tutor modeled after someone like Abraham Lincoln, Leonardo da Vinci, or Marie Curie. These tutors not only teach academic content but also provide insights into the lives and contributions of these figures, enriching the educational experience.

Many schools now utilize learning management systems for students to complete and track their schoolwork online. In some embodiments, the system 50 is configured to integrate with a school's existing learning management system. This integration can be done by allowing a user to view their school's existing learning management system within a screen within the virtual learning environment much like they would access any website or video within the virtual learning environment.

As part of integration of an existing learning management system, some embodiments include a dashboard 375 that allows for a student or user to track lesson progress. This can be done through a dashboard 375 that is separate from an existing learning management system. The dashboard allows for the student and the teacher or instructor to track and manage lessons and the progress of the student. The dashboard may be integrated into the virtual world as a board near the teacher avatar and can be referenced by the user within the world. The dashboard may be a separate from the virtual world in some embodiments.

Referring now to FIG. 4, a schematic flow diagram of a method, according to one or more embodiments of the invention, is shown. The method 400 is a general method. The method 400 includes various steps. More or less steps may be used in other embodiments. At block 402, the method 400 includes generating a virtual learning environment comprising a three-dimensional interactive virtual environment. At block 404, the method 400 includes generating at least one student avatar related to a user and a second avatar that functions as an automated tutor. At block 406, the method 400 includes powering the automated tutor by an AI processor and machine learning to generate interactive real-time responses in response to queries input by the user. The method 400 then ends.

In some embodiments, the computer-implemented method further includes storing training materials for the automated tutor in a teacher database, wherein the training materials are used to train the automated tutor to mimic a real-life teacher. In some embodiments, the computer-implemented method further includes training the automated tutor to clone the voice of the real-life teacher.

In some embodiments, the computer-implemented method further includes generating a series of questions to the user and determining an expected education level of the user based off answers to the questions. In some embodiments, the computer-implemented method further includes generating responses to the queries based on the expected education level of the user.

In some embodiments, the computer-implemented method further includes utilizing an AI algorithm to analyze actions and performance of the at least one student avatar to generate tailored learning exercises. In some embodiments, the computer-implemented method further includes translating the real-time response into a second language.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method comprising:

generating, by use of a processor, a virtual learning environment comprising a three-dimensional interactive virtual environment that generates a three-dimensional learning space, generating at least one three-dimensional student avatar related to a user within the three-dimensional learning space and generates a second three-dimensional avatar within the three-dimensional learning space, wherein the second three-dimensional avatar functions as an automated tutor;

generating a student database that stores data and information about the user, wherein the data and information about the user determines a teaching level for the automated tutor;

generating a teacher database that stores training materials including course materials, recorded video lectures, audio clips, written notes, assignments, or lesson plans related to a real-life teacher, and wherein the training materials are used to train the automated tutor to clone a voice of the real-life teacher and use the voice for the automated tutor, and wherein the training materials are used to train the automated tutor to mimic a teaching style of the real-life teacher;

wherein the automated tutor is powered by an AI processor and machine learning to generate interactive real-time responses in response to queries input by the user, and wherein the AI processor utilizes a plurality of stored training materials to generate responses that are presented by the second three-dimensional avatar;

generating a series of questions to the three-dimensional student avatar of the user and storing responses to the series of questions;

evaluating the responses using advanced natural language processing techniques and machine learning algorithms, wherein evaluating the responses includes evaluating an accuracy, depth, and context of the responses; and after evaluating the responses, providing feedback to the user and developing a plan of materials to be shown by the automated tutor to the user.

2. The computer-implemented method of claim 1, further comprising adjusting a speed at which new materials are introduced to the user, wherein the adjusting is based on the responses.

3. The computer-implemented method of claim 2, further comprising utilizing an AI algorithm to analyze actions and performance of the at least one student avatar to generate tailored learning exercises.

4. The computer-implemented method of claim 3, further comprising translating the real-time response into a second language.

5. A computer system, comprising:

one or more processors;

memory including instructions which, when accessed by the one or more processors, cause the one or more processors to:

generate a virtual learning environment comprising a three-dimensional interactive virtual environment that generates a three-dimensional learning space, wherein the virtual learning environment includes at least one three-dimensional student avatar related to a user within the three-dimensional learning space and a second three-dimensional avatar within the three-dimensional learning space, wherein the second three-dimensional avatar functions as an automated tutor;

generate a student database that stores data and information about the user, wherein the data and information about the user determines a teaching level for the automated tutor;

generate a teacher database that stores training materials including course materials, recorded video lectures, audio clips, written notes, assignments, or lesson plans related to a real-life teacher, and wherein the training materials are used to train the automated tutor to clone a voice of the real-life teacher and use the voice for the automated tutor, and wherein the training materials are used to train the automated tutor to mimic a teaching style of the real-life teacher;

wherein the automated tutor is powered by an AI processor and machine learning to generate interactive real-time responses in response to queries input by the user, wherein the AI processor utilizes a plurality of stored training materials to generate responses that are presented by the second three-dimensional avatar;

generate a series of questions to the three-dimensional student avatar of the user and storing responses to the series of questions;

evaluate the responses using advanced natural language processing techniques and machine learning algorithms, wherein evaluating the responses includes evaluating an accuracy, depth, and context of the responses; and after evaluating the responses, provide feedback to the user and developing a plan of materials to be shown by the automated tutor to the user.

6. The computer system of claim 5, wherein the memory includes further instructions which cause the one or more processors to:

adjust a speed at which new materials are introduced to the user, wherein the adjusting is based on the responses.

7. The computer system of claim 6, wherein the memory includes further instructions which cause the one or more processors to: utilize an AI algorithm to analyze actions and performance of the at least one student avatar to generate tailored learning exercises.

8. The computer system of claim 7, wherein the memory includes further instructions which cause the one or more processors to: translate the real-time response into a second language.

9. A computer system comprising:

a core engine comprising one or more processors and configured to generate a virtual learning environment comprising a three-dimensional interactive virtual environment that generates a three-dimensional learning space, wherein the core engine is configured to communicate with a student database that stores data and information about the user, wherein the data and information about the user determines a teaching level for the automated tutor, and wherein the core engine is configured to communicate with a teacher database that stores training materials including course materials, recorded video lectures, audio clips, written notes, assignments, or lesson plans related to a real-life teacher, and wherein the training materials are used to train the automated tutor to clone a voice of the real-life teacher and use the voice for the automated tutor, and wherein the training materials are used to train the automated tutor to mimic a teaching style of the real-life teacher;

an avatar engine comprising one or more processors and configured to generate at least one three-dimensional student avatar related to a user within the three-dimensional learning space;

an automated teacher engine comprising one or more processors and configured to generate a second three-dimensional avatar, wherein the second three-dimensional avatar functions as an automated tutor within the three-dimensional learning space, wherein the automated tutor is powered by an AI processor and machine learning to generate interactive real-time responses in response to queries input by the user, and wherein the AI processor utilizes a plurality of stored training materials to generate responses that are presented by the second three-dimensional avatar;

wherein the automated teacher engine is configured to generate a series of questions to the three-dimensional student avatar of the user and storing responses to the series of questions;

wherein the automated teacher engine is configured to evaluate the responses using advanced natural language processing techniques and machine learning algorithms, wherein evaluating the responses includes evaluating an accuracy, depth, and context of the responses; and wherein the automated teacher engine is configured to, after evaluating the responses, provide feedback to the user and developing a plan of materials to be shown by the automated tutor to the user.

10. The computer system of claim 9, wherein the artificial intelligence engine is configured to adjust a speed at which new materials are introduced to the user, wherein the adjusting is based on the responses.

11. The computer system of claim 10, wherein the artificial intelligence engine is configured to utilize an AI algorithm to analyze actions and performance of the at least one student avatar to generate tailored learning exercises.

\* \* \* \* \*